United States Patent [19]
Kato et al.

[11] Patent Number: 5,626,412
[45] Date of Patent: May 6, 1997

[54] LIGHTING DEVICE FOR VEHICLE

[75] Inventors: Hideyuki Kato, Nishio; Hiroshi Ito, Tokyo, both of Japan

[73] Assignee: Nippondenso Co., Ltd., Kariya, Japan

[21] Appl. No.: 355,694

[22] Filed: Dec. 14, 1994

[30] Foreign Application Priority Data

Dec. 15, 1993 [JP] Japan .................................. 5-315604

[51] Int. Cl.⁶ .................................................. F21V 7/04
[52] U.S. Cl. .................................................. 362/32
[58] Field of Search .................................................. 362/32

[56] References Cited

U.S. PATENT DOCUMENTS

5,257,168  10/1993  Davenport et al. .
5,278,731  1/1994   Davenport et al. .

Primary Examiner—Carroll B. Dority
Attorney, Agent, or Firm—Cushman Darby & Cushman, Intellectual Property Group of Pillsbury Madison & Sutro LLP

[57] ABSTRACT

A lighting device for a vehicle includes an optical fiber having a light emitting end. A reflecting plate extends frontward of the light emitting end of the optical fiber, and separates a region frontward of the light emitting end of the optical fiber into first and second sub regions. The reflecting plate serves to reflect a portion of light emitted from the light emitting end of the optical fiber. An optical member is located at one of the first and second sub regions. The optical member is separate from the light emitting end of the optical fiber. The optical member serves to act on light emitted from the light emitting end of the optical fiber and light reflected by the reflecting plate.

10 Claims, 9 Drawing Sheets

LIGHTING DEVICE FOR VEHICLE

BACKGROUND OF THE INVENTION

1. Field of the Invention

This invention relates to a lighting device for a vehicle such as an automotive vehicle.

2. Description of Related Art

In some of prior-art lighting devices for vehicles, light emitted from a light source is incident to an end of a bundle of optical fibers before being guided through the bundle of optical fibers. Then, light outputted from the other end of the bundle of optical fibers is emitted forward of a vehicle through an optical transmission device.

In general, such a prior-art lighting device can not be compact since the optical transmission device has a complicated structure. The prior-art lighting device tends to be insufficient in the ability to illuminate a region forward of a vehicle up to a distant place.

SUMMARY OF THE INVENTION

It is an object of this invention to provide an improved lighting device for a vehicle.

This invention provides a lighting device for a vehicle which comprises an optical fiber having a light emitting end; a reflecting plate extending frontward of the light emitting end of the optical fiber and separating a region frontward of the light emitting end of the optical fiber into first and second sub regions, the reflecting plate reflecting a portion of light emitted from the light emitting end of the optical fiber; and an optical member located at one of the first and second sub regions and being separate from the light emitting end of the optical fiber, the optical member acting on light emitted from the light emitting end of the optical fiber and light reflected by the reflecting plate.

It is preferable that the optical member is subjected to all light emitted from the light emitting end of the optical fiber into the sub region where the optical member is located.

The optical member is now referred to as the first optical member. It is preferable to provide a second optical member. The first optical member and the second optical member are located in the first and second sub regions respectively. The first optical member is operative for forming a hot illuminated zone having a first brightness. The second optical member acts on light emitted from the light emitting end of the optical fiber into the second sub region, and is operative for forming an elongate illuminated zone having a second brightness lower than the first brightness.

It is preferable to provide a first shade for blocking a portion of light emitted from the light emitting end of the optical fiber toward the first sub region, and a second shade for blocking a portion of light emitted from the light emitting end of the optical fiber toward the second sub region.

It is preferable that the first optical member extends below the second optical member.

The first optical member may comprise a first Fresnel lens while the second optical member may comprise a second Fresnel lens.

DESCRIPTION OF THE PREFERRED EMBODIMENTS

First Embodiment

Figure 1:
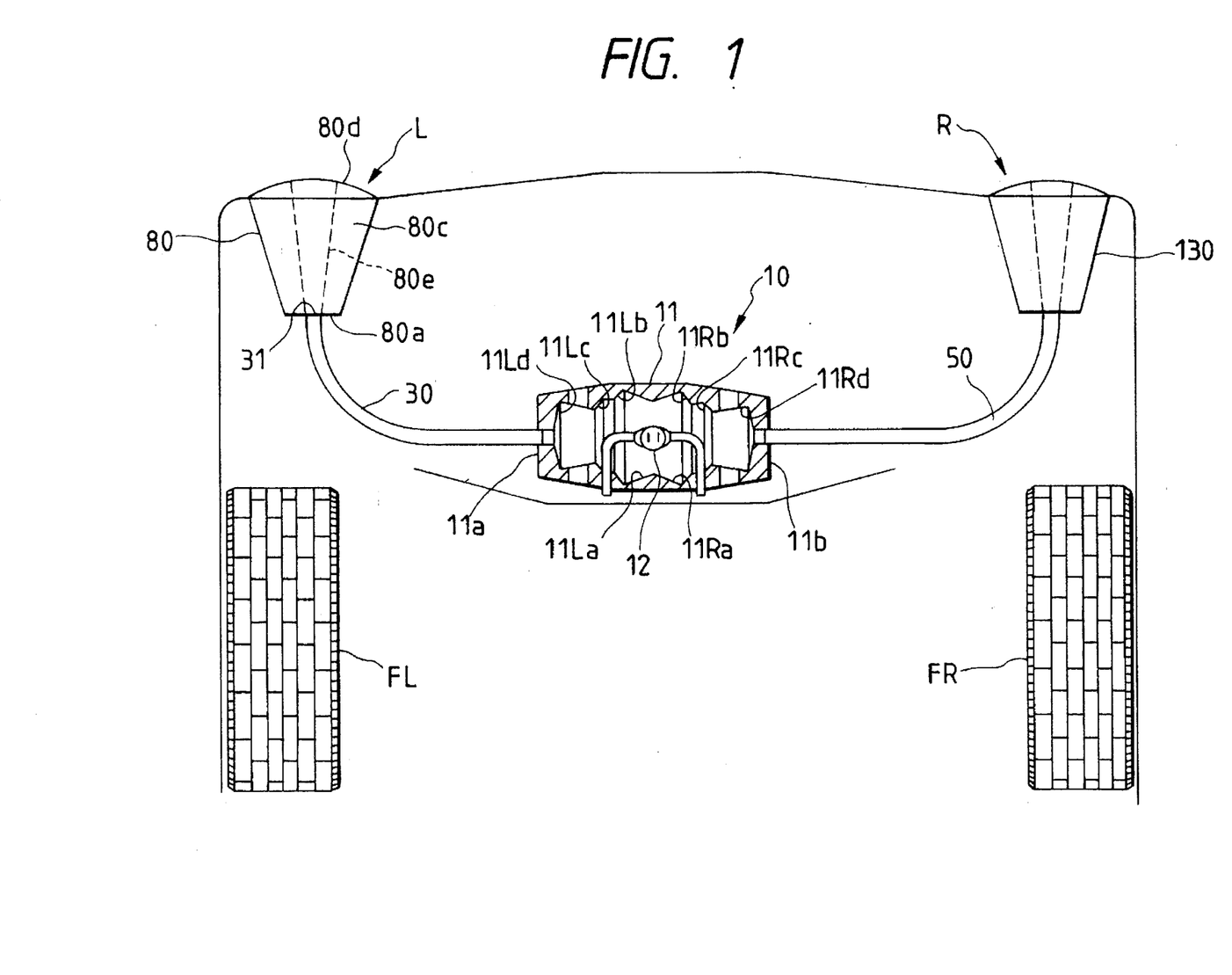
FIG. 1 is a sectional view of a lighting device according to a first embodiment of this invention.

With reference to FIG. 1, a lighting device for a vehicle includes a light source 10 provided at the central position in the transverse direction of a front part of the vehicle. The lighting device also includes a left-hand head lamp L and a right-hand head lamp R which are provided at positions symmetrical with respect to the light source 10 in the transverse direction of the vehicle.

The light source 10 has an approximately cylindrical casing 11. A discharge tube 12 used as a linear light source is placed within the casing 11. The position of the discharge tube 12 coincides with the central position in the axial direction of the casing 11. The inner walls of the casing 11 are formed with left-hand ellipsoidal mirrors 11L$a$–11L$d$ and right-hand ellipsoidal mirrors 11R$a$–11L$d$ extending at positions symmetrical with respect to the discharge tube 11 in the transverse direction of the vehicle.

Light generated by a discharge of the discharge tube 12 is reflected by the right-hand ellipsoidal mirror 11R$a$ and the left-hand ellipsoidal mirrors 11L$b$–11L$d$, being converged on the center of a right-side wall 11$b$ of the casing 11. The light generated from the discharge tube 12 is also reflected by the left-hand ellipsoidal mirror 11L$a$ and the right-had ellipsoidal mirrors 11R$b$–11R$d$, being converged on the center of a left-side wall 11$a$ of the casing 11.

It should be noted that, in FIG. 1, the reference characters FL and FR denote a front-left wheel (tire) and a front-right wheel (tire) of the vehicle respectively.

The left-hand head lamp L includes an optical fiber 30 and a lamp body 80. One end of the optical fiber 30 is connected to the left-side wall 11$a$ of the light source 10. The other end of the optical fiber 30 is connected to the lamp body 80. The lamp body 80 is located on a left-hand part of the front of the vehicle.

The right-hand head lamp R includes an optical fiber 50 and a lamp body 130. One end of the optical fiber 50 is connected to the right-side wall 11b of the light source 10. The other end of the optical fiber 50 is connected to the lamp body 130. The lamp body 130 is located on a right-hand part of the front of the vehicle.

Each of the optical fibers 30 and 50 has a rod-like core and a cladding which covers the core. The core is made of resin such as polycarbonate, or acrylic resin, which preferably has a high heat resistance and a good light permeability (transmittance). The refractive index of the composing material of the cladding is set smaller than that of the core so that a total reflection of light will occur in the core. The diameter of the core is preferably in the range of about 8 mm to about 10 mm.

As shown in FIG. 1, each of the optical fibers 30 and 50 has an L-shaped configuration. The end of the optical fiber 30 fits into the center of the left-side wall 11a of the light source 10. The end of the optical fiber 50 fits into the center of the right-side wall 11b of the light source 10. The angle of incidence of light from the light source 10 to the incident end surface of the core of each of the optical fibers 30 and 50 is preferably in the range of 0 degree to 35 degrees.

The left-hand head lamp L will now be described in detail. The rear of the lamp body 80 of the left-hand head lamp L is connected with the light emitting end (light output end) 31 of the optical fiber 30. Generally, the light emitting end 31 of the optical fiber 30 is designed so that light outputted therefrom can form a conically-spreading beam having an apex angle (a diverging angle) of about 70 degrees.

As shown in FIGS. 1, 2, 3, 4, and 5, the lamp body 80a includes a pair of plate-like upper and lower shades 80a and 80b, a reflecting plate 80c, a first optical member 80d, and a second optical member 80e. The upper and lower shades 80a and 80b cover an upper edge region and a lower edge region of the output end (light emitting plane) 31 of the optical fiber 30.

With reference to FIGS. 2, 3, 4, and 5, perpendicular X, Y, and Z axes are defined which extend along the frontward longitudinal direction, the transverse direction (left-to-right direction), and the upward vertical direction of the vehicle respectively. Also, X-Y, Y-Z, and X-Z (Z-X) planes are defined in connection with the X, Y, and Z axes.

Figure 5:
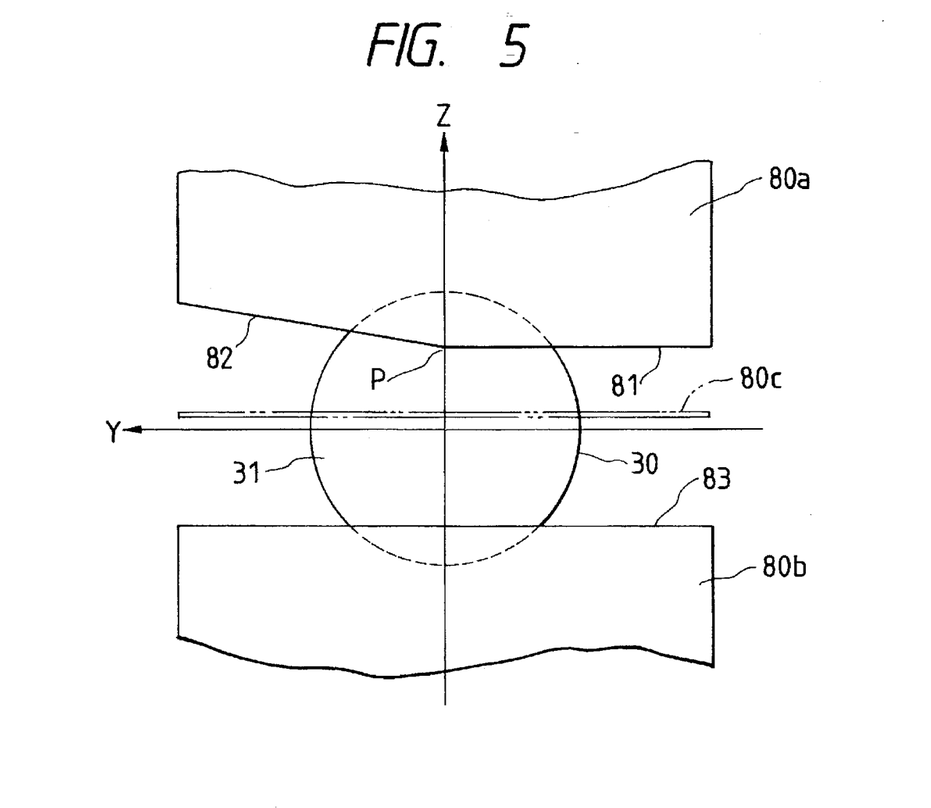
FIG. 5 is a front view of a pair of shades in the left-hand head lamp of FIG. 2.

As shown in FIG. 5, a lower edge of the upper shade 80a has a horizontal portion 81 and an inclined portion 82. The horizontal portion 81 extends parallel with the Y axis. The inclined portion 82 is oblique with respect to the Y axis at a given angle equal to, for example, 15 degrees. The horizontal portion 81 and the inclined portion 82 meet at an intersection point P which exists on the X-Z plane. As shown in FIG. 5, the lower shade 80b has an upper edge 83, the whole of which extends parallel with the Y axis.

The reflecting plate 80c extends frontward of the light emitting end 31 of the optical fiber 30 and in parallel with the X-Y plane. The reflecting plate 80c separates a region frontward of the light emitting end 31 of the optical fiber 30 into an upper side and a lower side. The reflecting plate 80c has a rear edge which contacts the light emitting end 31 of the optical fiber 30. It is preferable that the reflecting plate 80c has a small thickness to cause only a small loss of light outputted from the light emitting end 31 of the optical fiber 30.

Figure 6:
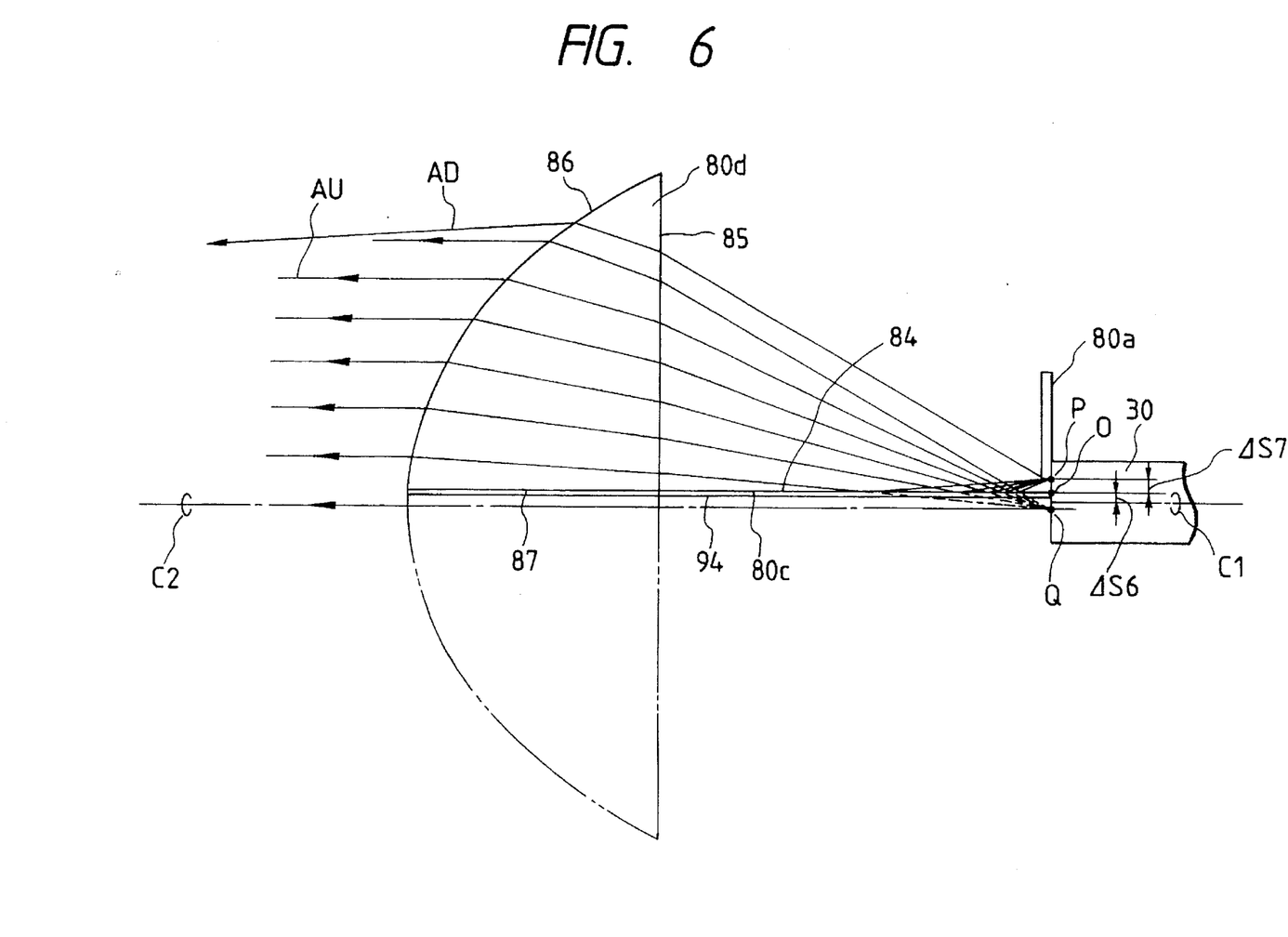
FIG. 6 is a side view of a first optical member and related parts of the left-hand head lamp in FIG. 2.

The reflecting plate 80c has an upper surface 84 provided with a reflecting surface for reflecting at least light outputted from an upper part of the light emitting end 31 of the optical fiber 30. As shown in FIG. 6, the reflecting surface 84 extends along a plane containing the point "O", and the plane of the reflecting surface 84 is offset upward from the central line (axis) c1 of the optical fiber 30 by a given distance $\Delta S6$ equal to, for example, 1 mm. It should be noted that the central line c1 of the optical fiber 30 agrees with the X axis. The reflecting surface 84 has a given approximately sectoral shape so as to reflect light outputted from the light emitting end 31 of the optical fiber 30 which forms a conically-spreading beam having an apex angle (a diverging angle) of about 70 degrees.

The reflecting plate 80c is made of a metal plate such as an aluminum plate having a high reflectivity. Alternatively, the reflecting plate 80c has a strong substrate provided with a metal plating or a reflective coating.

Figure 2:
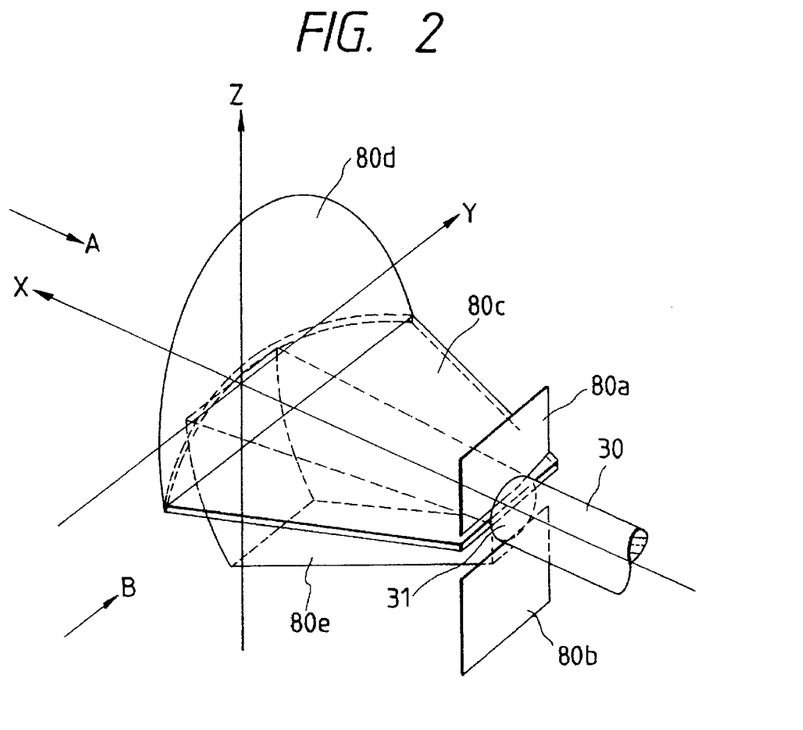
FIG. 2 is a perspective view of a left-hand head lamp in the lighting device of FIG. 1.
Figure 3:
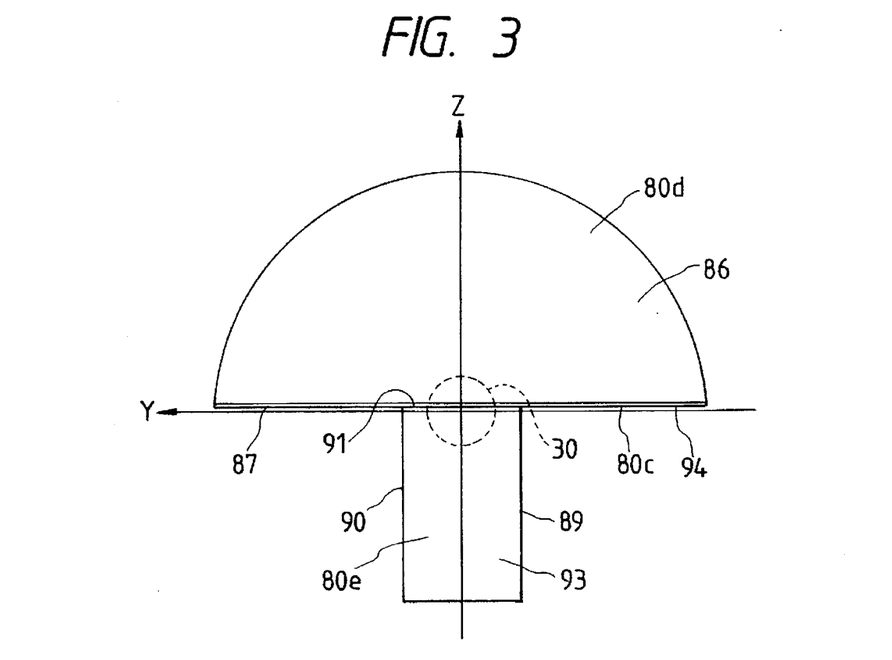
FIG. 3 is a front illustration of the left-hand head lamp as viewed in the direction of the arrow A in FIG. 2.
Figure 4:
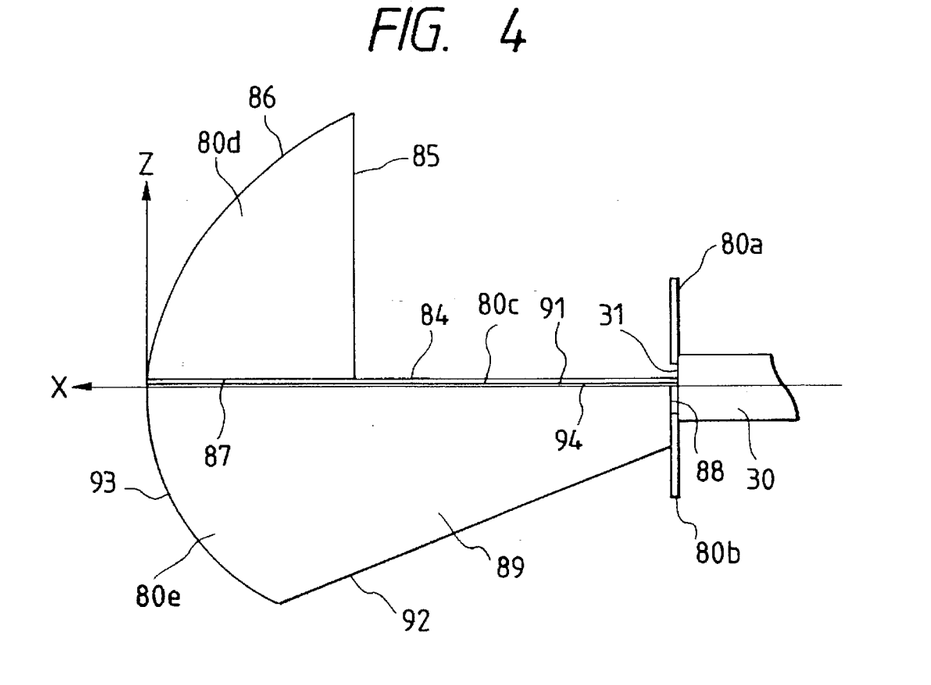
FIG. 4 is a side illustration of the left-hand head lamp as viewed in the direction of the arrow B in FIG. 2.

The first optical member 80d is fixed to the upper side of a front end of the reflecting plate 80c by a suitable bonding device or suitable bonding material such as adhesive. The first optical member 80d is separate from the light emitting end 31 of the optical fiber 30 by a given space. As shown in FIGS. 2, 3, and 4, the first optical member 80d includes an approximately semicircular convex lens having a light incidence surface (light input surface) 85, a light emitting surface (light output surface) 86, and a bottom surface 87. The light incidence surface 85 extends along a flat plane parallel to the Y-Z plane. The light emitting surface 86 extends along a frontwardly-projecting spherical plane. The bottom surface 87 extends along a flat plane parallel to the X-Y plane. The semicircular convex lens 80d is made of glass or resin such as polycarbonate, or acrylic resin, which preferably has a high heat resistance and a good light permeability (transmittance).

The semicircular convex lens 80d is located and directed so that, as shown in FIG. 6, light outputted from a region immediately below the lower edge of the upper shade 80a (the point "P") and reflected by the reflecting surface 84 of the reflecting plate 80c will form approximately horizontally-travelling light AU leaving the output surface 86. Thus, the incidence-side focal point of the semicircular convex lens 80d coincides with the point "Q" which exists on the X-Z plane and which downwardly separates from the point "O" by a given distance equal to the distance $\Delta S7$ between the points "P" and "O". In addition, the axis (central line) c2 of the semicircular convex lens 80d extends parallel with the X axis and passes through the point "Q". Therefore, as shown in FIG. 6, light outputted from the point "P" and directly entering the input surface 85 of the semicircular convex lens 80d without being reflected by the reflecting surface 84 forms downwardly-sloping light AD leaving the output surface 86.

The output surface 86 of the semicircular convex lens 80d may be aspherical to compensate for aberration. In this case, light incident to a region of the input surface 85 remarkably remote from the axis c2 is prevented from becoming light leaving the output surface 86 in a direction deviating from a horizontal direction AU. In other words, the aspherical output surface 86 ensures that light incident to a region of the input surface 85 remarkably remote from the axis c2 forms approximately horizontally-travelling light AU leaving the output surface 86.

The second optical member 80e includes a light guiding member provided below the reflecting plate 80c. The light guiding member 80e is made of material such as polycarbonate or acrylic which preferably has a good light permeability (transmittance). As shown in FIGS. 3 and 4, the light guiding member 80e has a light incidence surface (light input surface) 88 extending along a flat plane parallel with the Y-Z plane. The light guiding member 80e has a pair of side surfaces 89 and 90 separated from each other by a distance which increases in the X-axis direction. The light guiding member 80e has an upper surface 91 extending along a flat plane parallel with the X-Y plane. The light guiding member 80e has a bottom surface 92 which downwardly slopes in the frontward direction of the vehicle. The light guiding member 80e has a light emitting surface (light output surface) 93 extending along a cylindrical plane parallel with the Y axis.

The input surface 88 of the light guiding member 80e has an upper portion contacting the lower shade 80b, and a lower portion fixed to the light emitting end 31 of the optical fiber 30 by transparent adhesive. The upper surface 91 of the light guiding member 80e extends below the lower surface 94 of the reflecting plate 80c by a small distance, and forms a reflecting surface for reflecting light which has entered the light guiding member 80e via the input surface 88. The side surfaces 89 and 90 of the light guiding member 80e are formed with reflecting surfaces similarly to the upper surface 91.

The upper surface 91 of the light guiding member 80e may be in contact with the lower surface 94 of the reflecting plate 80c. In this case, it is preferable to provide a reflecting surface on the lower surface 94 of the reflecting plate 80c to prevent the absorption of light by the reflecting plate 80c.

Figure 7:
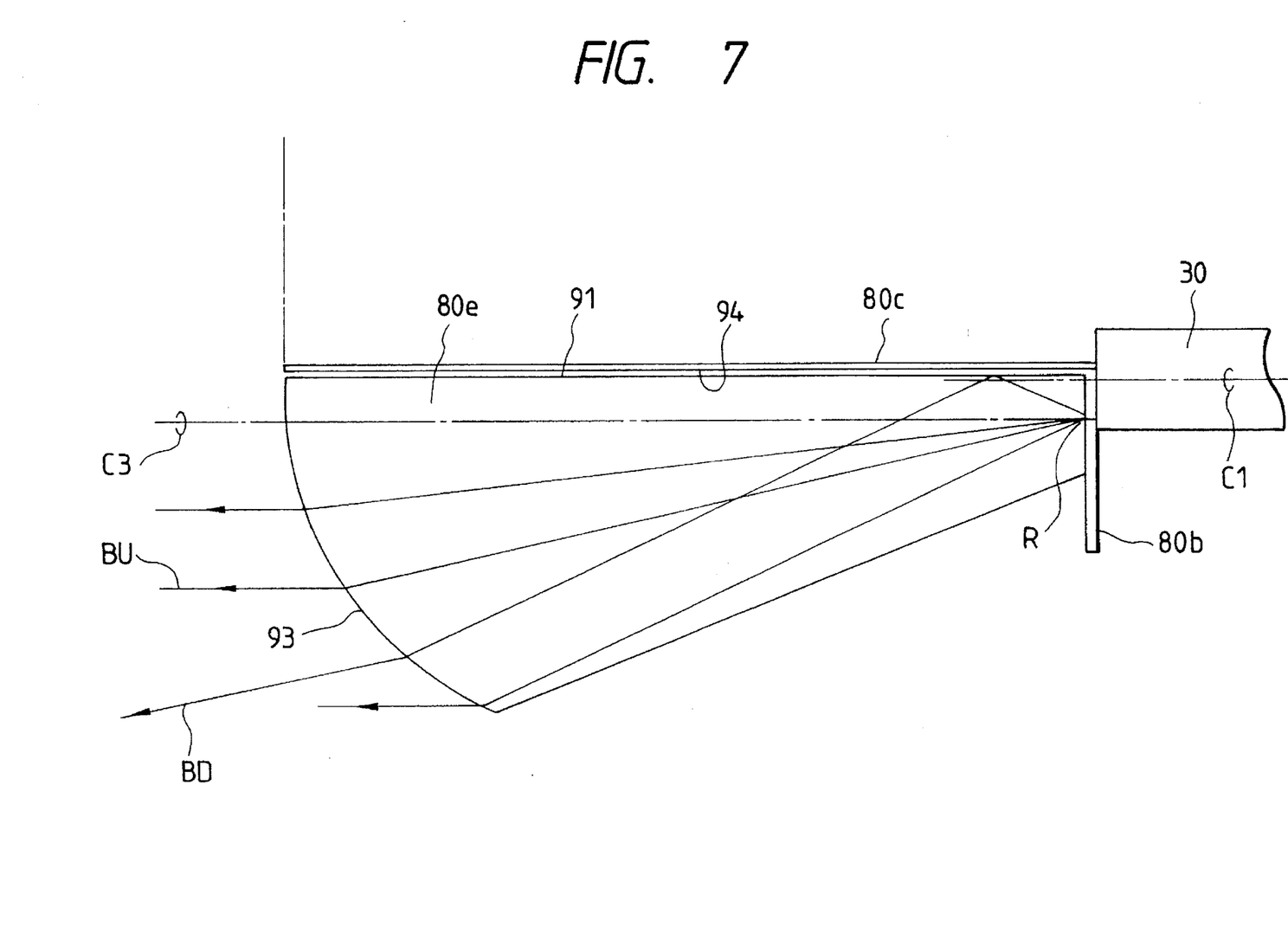
FIG. 7 is a side view of a second optical member and related parts of the left-hand head lamp in FIG. 2.

The light guiding member 80e is located and directed so that, as shown in FIG. 7, light being incident thereto from a region immediately above the upper edge of the lower shade 80b (the point "R") and advancing without being reflected by the upper surface 91 will form approximately horizontally-travelling light BU leaving the output surface 93. Thus, the incidence-side focal point of the output surface 93 of the light guiding member 80e coincides with the point "R". In addition, the axis (central line) c3 of the light guiding member 80e extends parallel with the X axis and passes through the point "R". Therefore, as shown in FIG. 7, light being incident to the input surface 88 of the light guiding member 80e and reflected by the upper surface 91 forms downwardly-sloping light BD leaving the output surface 93.

Light leaves the output surface 93 of the light guiding member 80e at angles in a diverging rage which is narrower than a 70 degree range in the Y-axis direction. The reason for this fact will be given in the following. As previously described, the light emitting end 31 of the optical fiber 30 is designed so that light outputted therefrom can form a conically-spreading beam having an apex angle (a diverging angle) of about 70 degrees. The distance between the side surfaces 89 and 90 of the light guiding member 80e increases in the X-axis direction at a given rate chosen so that the spreading angle (diverging angle) of the light beam emitted from the output surface 93 thereof will be narrower than 70 degrees in the Y-axis direction in spite of the above-indicated design of the light emitting end 31 of the optical fiber 30. Therefore, it is possible to prevent an undue spread of light leaving from the output surface 93 of the light guiding member 80e.

The lamp body 130 of the right-hand head lamp R is similar in structure to the lamp body 80 of the left-had head lamp L. A detailed description of the lamp body 130 of the right-hand head lamp R will be omitted.

The lighting device of FIGS. 1–7 operates as follows. Light emitted from the light source 10 is incident to the core of the optical fiber 30 at an angle in the range of 0 degree to 35 degrees. Then, the light is guided by the optical fiber 30 while being reflected in the core thereof. Subsequently, the light reaches the light emitting end 31 of the optical fiber 30.

A portion of the light which has reached an upper edge region of the light emitting end 31 of the optical fiber 31 is blocked by the upper shade 80a. In addition, a portion of the light which has reached a lower edge region of the light emitting end 31 of the optical fiber 31 is blocked by the lower shade 80b. Therefore, only a portion of the light which has reached a central region of the light emitting end 31 of the optical fiber 31 in the Z-axis direction is enabled to pass through and exit from the light emitting end 31 of the optical fiber 30.

A portion of light, which has entered a region above the reflecting plate 80c from the light emitting end 31 of the optical fiber 30, is reflected by the reflecting plate 80c and is then incident to the input surface 85 of the semicircular convex lens 80d before passing through the semicircular convex lens 80d and leaving the output surface 86 thereof as approximately horizontally-travelling light AU. A remaining portion of the light directly enters the semicircular convex lens 80d, and passes through the semicircular convex lens 80d before leaving the output surface 86 thereof as downwardly-sloping light AD. A beam of the light which has left the output surface 86 of the semicircular convex lens 80d forms a hot zone Z1 surrounded by the solid line in a light-intensity distribution pattern of FIG. 8. The hot zone Z1 has inclined edges p1 and p2 caused by the inclined portion 82 of the upper shade 80a.

On the other hand, light which has entered a region below the reflecting plate 80c from the light emitting end 31 of the optical fiber 30 is directly incident to the light guiding member 80e via the input surface 88 thereof. A first portion of the light advances in the light guiding member 80e without being reflected by the upper surface 91 thereof, and then leaves the output surface 93 thereof as approximately horizontally-travelling light BU. A second portion of the light advances in the light guiding member 80e while being reflected by the upper surface 91 thereof, and then leaves the output surface 93 thereof as downwardly-sloping light BD. A third portion of the light advances in the light guiding member 80e while being reflected by the side surfaces 89 and 90 thereof, and then leaves the output surface thereof 93 as a conically-spreading beam having a diverging angle (an apex angle) narrower than 70 degrees. A beam of the light which has left the output surface 93 of the light guiding member 80e forms a horizontally elongate zone Z2 surrounded by the broken line in the light-intensity distribution pattern of FIG. 8. The horizontal dimension (the length along the left-right direction of the vehicle) of the horizontally elongate zone Z2 is remarkably greater than the vertical dimension (the with along the up-down direction of the vehicle) thereof.

Figure 8:
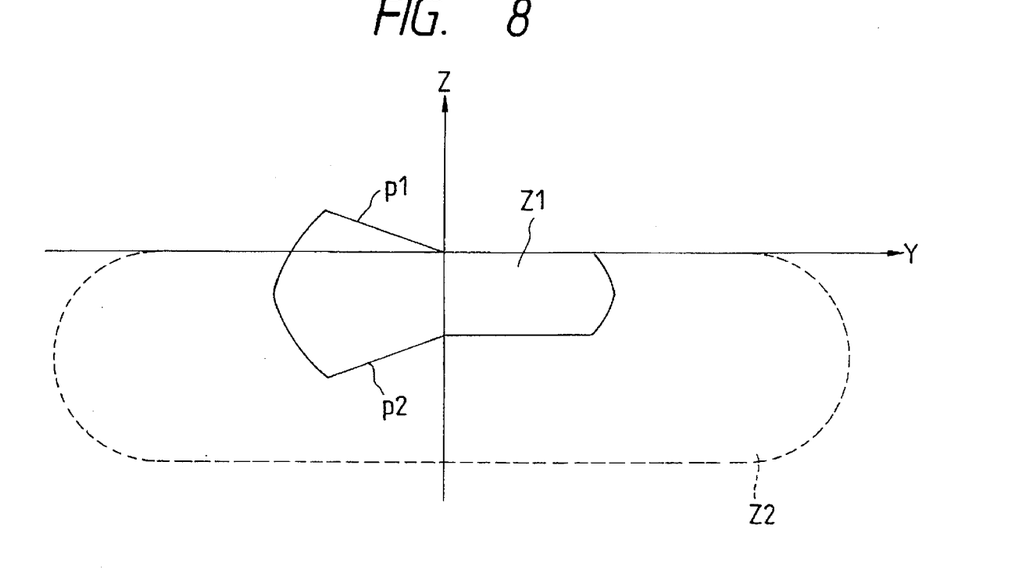
FIG. 8 is a diagram of a light-intensity distribution pattern formed by light beams emitted from the first and second optical members in the left-hand head lamp of FIG. 2.

With reference to FIG. 8, the hot zone Z1 and the horizontally elongate zone Z2 compose an area illuminated by the left-hand head lamp L. The hot zone Z1 and the horizontally elongate zone Z2 partially overlap with each other. The brightness of the hot zone Z1 is higher than the brightness of a portion of the horizontally elongate zone Z2 which does not overlap the hot zone Z1. As previously described, the hot zone Z1 is formed through the first optical member 80d by the light which has entered the region above the reflecting plate 80c from the light emitting end 31 of the optical fiber 30. On the other hand, the horizontally elongate zone Z2 is formed through the second optical member 80e by the light which has entered the region below the reflecting plate 80c from the light emitting end 31 of the optical fiber 30.

The left-hand head lamp L is advantageous as follows. The optical fiber 30 efficiently guides the light from the light source 10 to the lamp body 80. Therefore, the light generated by the light source 10 can be used at a high efficiency, and the left-hand head lamp L can illuminate a region forward of the vehicle up to a distant place. The shape of the cross section of the light beam emitted from the left-hand head lamp L agrees with a horizontally elongate configuration. Since the reflecting plate 80c is formed as a part of the lamp body 80, the lamp body 80 can be compact.

The right-hand head lamp R operates similarly to the previously-described operation of the left-hand head lamp L. The right-hand head lamp R provides a light-intensity distribution pattern similar to that in FIG. 8. The right-hand head lamp R has advantages similar to the previously-indicated advantages of the left-hand head lamp L.

Second Embodiment

Figure 9:
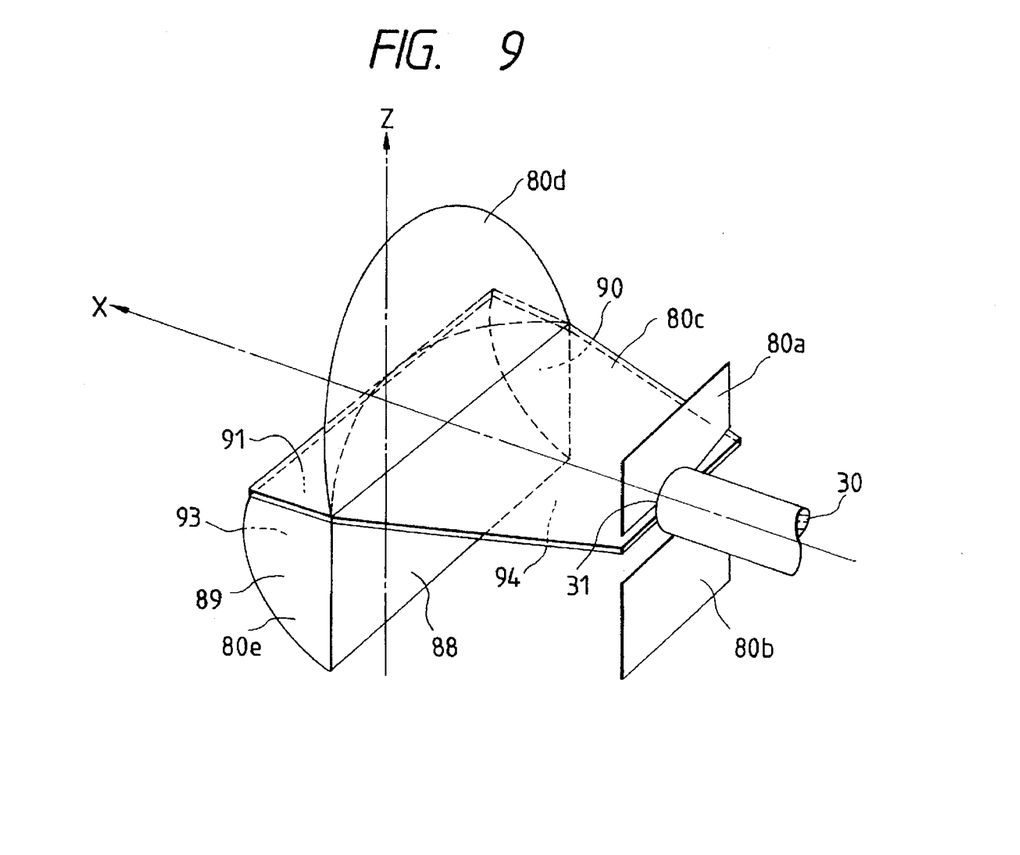
FIG. 9 is a perspective view of a left-hand head lamp in a lighting device according to a second embodiment of this invention.

FIG. 9 shows a second embodiment of this invention which is similar to the embodiment of FIGS. 1–8 except for design changes indicated hereinafter. In the embodiment of FIG. 9, a second optical member 80e within a lamp body 80 includes a cylindrical convex lens, and a lower surface 94 of a reflecting plate 80c is formed with a reflecting surface.

The cylindrical convex lens 80e is fixed to the lower side of a front end of the reflecting plate 80c by a suitable bonding device or suitable bonding material such as adhesive. The cylindrical convex lens 80e is separate from a light emitting end 31 of an optical fiber 30 by a given space. The cylindrical convex lens 80e is made of material such as glass, acrylic, or polycarbonate which preferably has a good light permeability (transmittance). The cylindrical convex lens 80e has a light incidence surface (light input surface) 88, a light emitting surface (light output surface) 93, an upper surface 91, and a pair of side surfaces 89 and 90. The light incidence surface 88 extends along a flat plane parallel with an Y-Z plane. The light emitting surface 93 extends along a cylindrical surface parallel with a Y axis. The upper surface 91 extends along a flat plane parallel with an X-Y plane. The side surfaces 89 and 90 extend along flat planes parallel with an X-Z plane.

Figure 10:
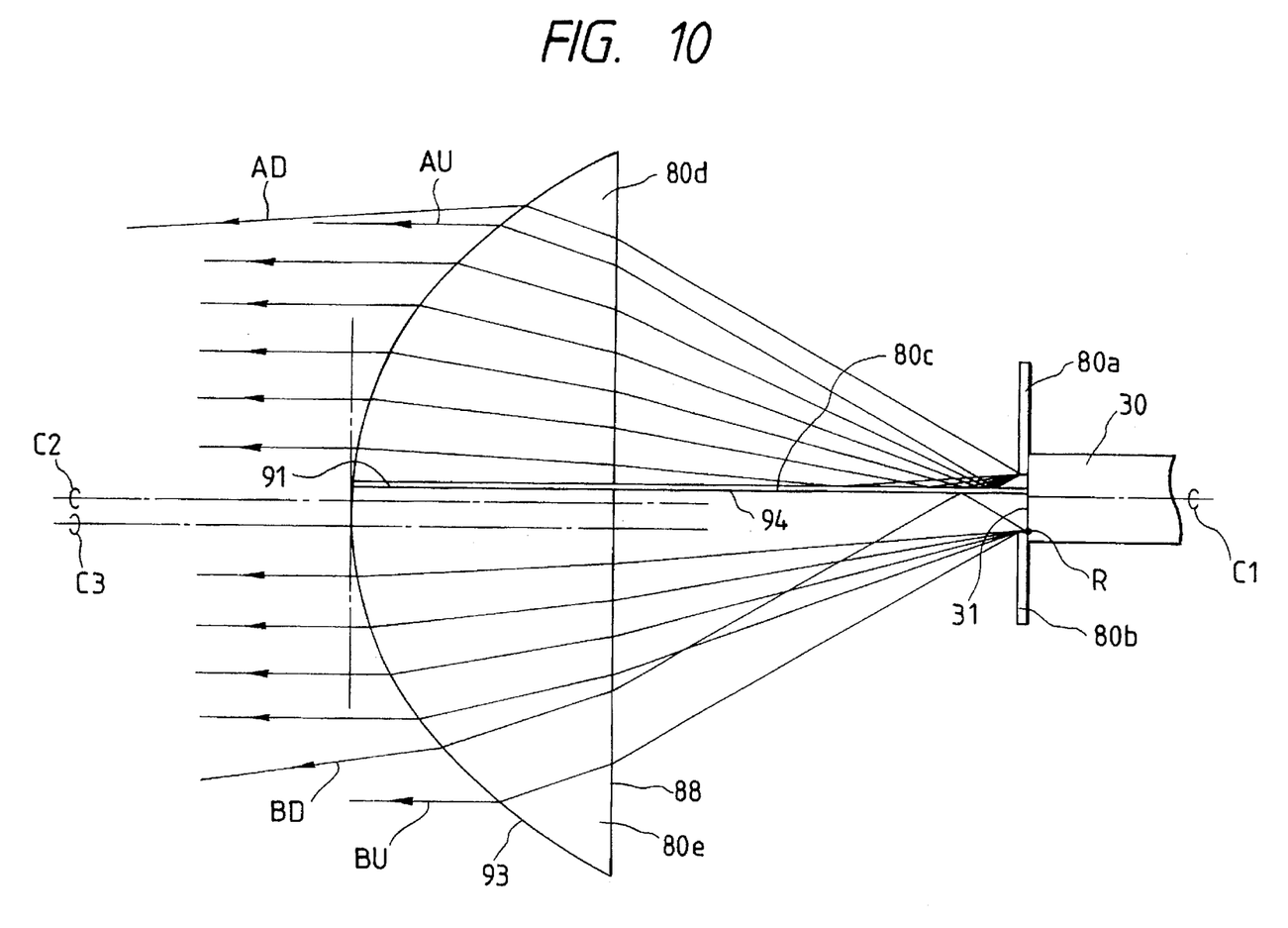
FIG. 10 is a side view of first and second optical members, a reflecting plate, and related parts of the left-hand head lamp in FIG. 9.

The cylindrical convex lens 80e is located and directed so that, as shown in FIG. 10, light being incident to the input surface 88 from a region immediately above the upper edge of a lower shade 80b (the point "R") without being reflected by the reflecting surface 94 of the reflecting plate 80c will form approximately horizontally-travelling light BU leaving the output surface 93. Thus, the incidence-side focal point of the cylindrical convex lens 80e coincides with the point "R". In addition, the axis (central line) c3 of the cylindrical convex lens 80e extends parallel with an X axis and passes through the point "R". Therefore, as shown in FIG. 10, light being incident to the input surface 88 from the region immediately above the upper edge of the lower shade 80b (the point "R") while being reflected by the reflecting surface 94 of the reflecting plate 80c will form downwardly-sloping light BD leaving the output surface 93.

Since light outputted from the light emitting end 31 of the optical fiber 30 forms a conically-spreading beam having an apex angle (a diverging angle) of about 70 degrees in a Y-axis direction, the spreading angle (diverging angle) of a light beam emitted from the output surface 93 of the cylindrical convex lens 80e is also equal to about 70 degrees. The input surface 88 of the cylindrical convex lens 80e is designed so as to receive all light outputted from the light emitting end 31 of the optical fiber 30 into a region below the reflecting plate 80c.

The embodiment of FIGS. 9 and 10 provides a light-intensity distribution pattern similar to that in FIG. 8. The embodiment of FIGS. 9 and 10 can illuminate a region forward of a related vehicle up to a distant place. The shape of the cross section of the light beam emitted from the embodiment of FIGS. 9 and 10 agrees with a horizontally elongate configuration. According to the embodiment of FIGS. 9 and 10, the lamp body 80 can be compact.

Third Embodiment

Figure 11:
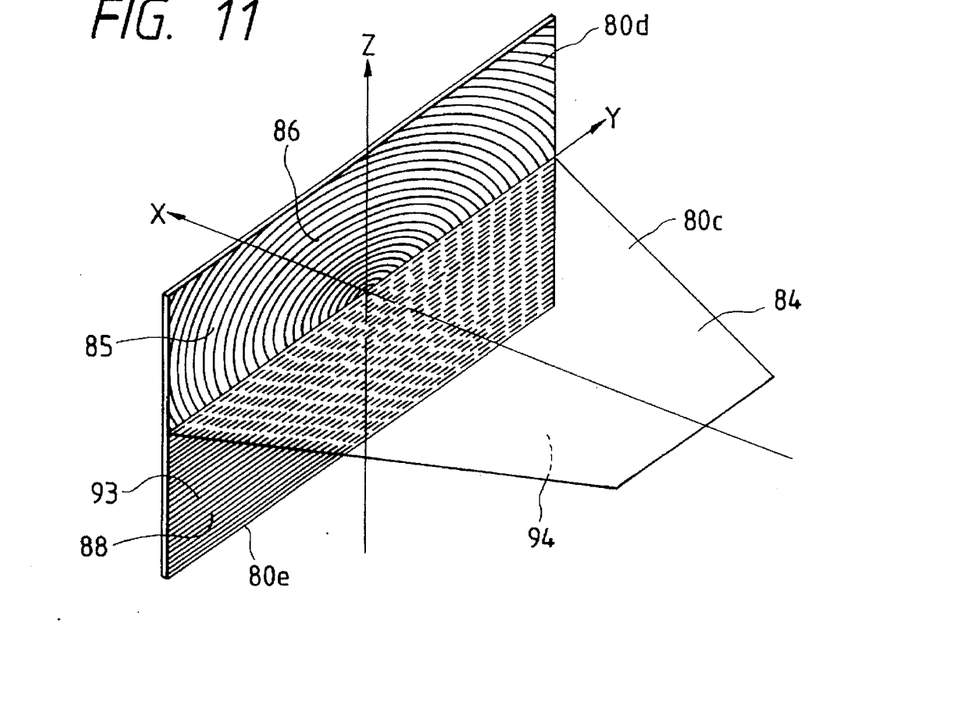
FIG. 11 is a perspective view of a portion of a left-hand head lamp in a lighting device according to a third embodiment of this invention.

FIG. 11 shows a third embodiment of this invention which is similar to the embodiment of FIGS. 1–8 except for design changes indicated hereinafter. In the embodiment of FIG. 11, a first optical member 80d within a lamp body 80 includes an upper half of a convex Fresnel lens while a second optical member 80e within the lamp body 80 includes a condenser Fresnel lens having the function of condensing light in a Z-axis direction. The convex Fresnel lens 80d and the condenser Fresnel lens 80e are separate from a light emitting end of an optical fiber. In addition, an upper surface 84 and a lower surface 94 of a reflecting plate 80c are formed with reflecting surfaces respectively.

The convex Fresnel lens 80d has a light incidence surface (light input surface) 85 and a light emitting surface (light output surface) 86. The condenser Fresnel lens 80e has a light incidence surface (light input surface) 88 and a light emitting surface (light output surface) 93. The convex Fresnel lens 80d and the condenser Fresnel lens 80e are made of resin such as polycarbonate, or acrylic resin, which preferably has a high heat resistance and a good light permeability (transmittance).

The convex Fresnel lens 80d is designed to have a function similar to the function of the semicircular convex lens 80d in the embodiment of FIGS. 1–8. The convex Fresnel lens 80d is located and directed so that light outputted from a region immediately below the lower edge of an upper shade 80a (the point "P" in FIG. 6) and reflected by the reflecting surface 84 of the reflecting plate 80c will form approximately horizontally-travelling light AU leaving the output surface 86. On the other hand, light outputted from the point "P" (see FIG. 6) and directly entering the input surface 85 of the convex Fresnel lens 80d without being reflected by the reflecting surface 84 forms downwardly-sloping light AD leaving the output surface 86.

The condenser Fresnel lens 80e is designed to have a function similar to the function of the cylindrical convex lens 80e in the embodiment of FIGS. 9 and 10. The condenser Fresnel lens 80e is located and directed so that light being incident to the input surface 88 from a region immediately above the upper edge of a lower shade 80b (the point "R" in FIG. 10) without being reflected by the reflecting surface 94 of the reflecting plate 80c will form approximately horizontally-travelling light BU leaving the output surface 93. On the other hand, light being incident to the input surface 88 from the region immediately above the upper edge of the lower shade 80b (the point "R" in FIG. 10) while being reflected by the reflecting surface 94 of the reflecting plate 80c will form downwardly-sloping light BD leaving the output surface 93.

Since light outputted from the light emitting end of the optical fiber forms a conically-spreading beam having an apex angle (a diverging angle) of about 70 degrees in an Y-axis direction, the spreading angle (diverging angle) of a light beam emitted from the output surface 93 of the condenser Fresnel lens 80e is also equal to about 70 degrees.

The embodiment of FIG. 11 provides a light-intensity distribution pattern similar to that in FIG. 8. The embodiment of FIG. 11 can illuminate a region forward of a related vehicle up to a distant place. The shape of the cross section of the light beam emitted from the embodiment of FIG. 11 agrees with a horizontally elongate configuration. According to the embodiment of FIG. 11, the lamp body 80 can be compact.

While both the first optical member 80d and the second optical member 80e are Fresnel lenses in the embodiment of FIG. 11, only one of the first optical member 80d and the second optical member 80e may be a Fresnel lens but the other may be an approximately semicircular convex lens or a cylindrical convex lens. In this case, the lamp body 80 can be compact since a Fresnel lens is thin.

Fourth Embodiment

Figure 12:
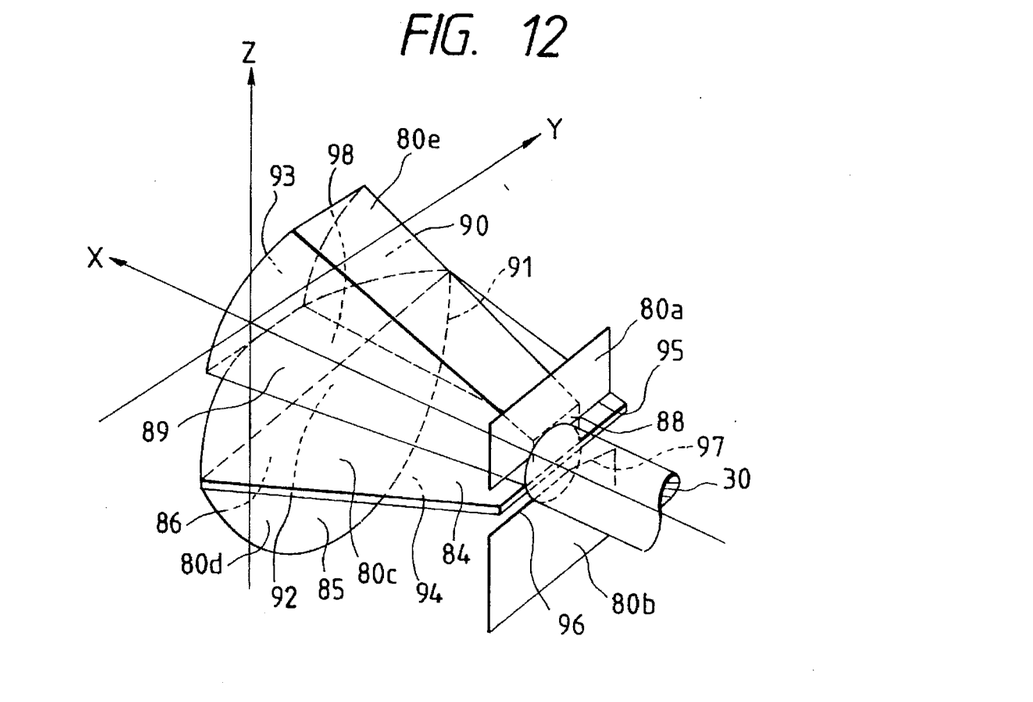
FIG. 12 is a perspective view of a left-hand head lamp in a lighting device according to a fourth embodiment of this invention.

FIG. 12 shows a fourth embodiment of this invention which is similar to the embodiment of FIGS. 1–8 except for design changes indicated hereinafter. In the embodiment of FIG. 12, a lower edge of an upper shade 80a is formed by only a horizontal portion 95 extending parallel with a Y axis, while an upper edge of a lower shade 80b has a horizontal portion 96 and an inclined portion 97. The horizontal portion 96 extends parallel with the Y axis. The inclined portion 97 is oblique with respect to the Y axis at a given angle equal to, for example, 15 degrees. It is preferable that the horizontal portion 96 and the inclined portion 97 meet at an intersection point "R" (see FIG. 13) which exists on an X-Z plane.

A first optical member 80d within a lamp body 80 is located at a lower side of a reflecting plate 80c. The first optical member 80d includes an approximately semicircular convex lens having a light incidence surface (light input surface) 85, a light emitting surface (light output surface) 86, and an upper surface 98. The light incidence surface 85 extends along a flat plane parallel to a Y-Z plane. The light emitting surface 86 extends along a frontwardly-projecting spherical plane. The upper surface 98 extends along a flat plane parallel to an X-Y plane. The semicircular convex lens 80d is made of glass or resin such as polycarbonate, or acrylic resin, which preferably has a high heat resistance and a good light permeability (transmittance).

Figure 13:
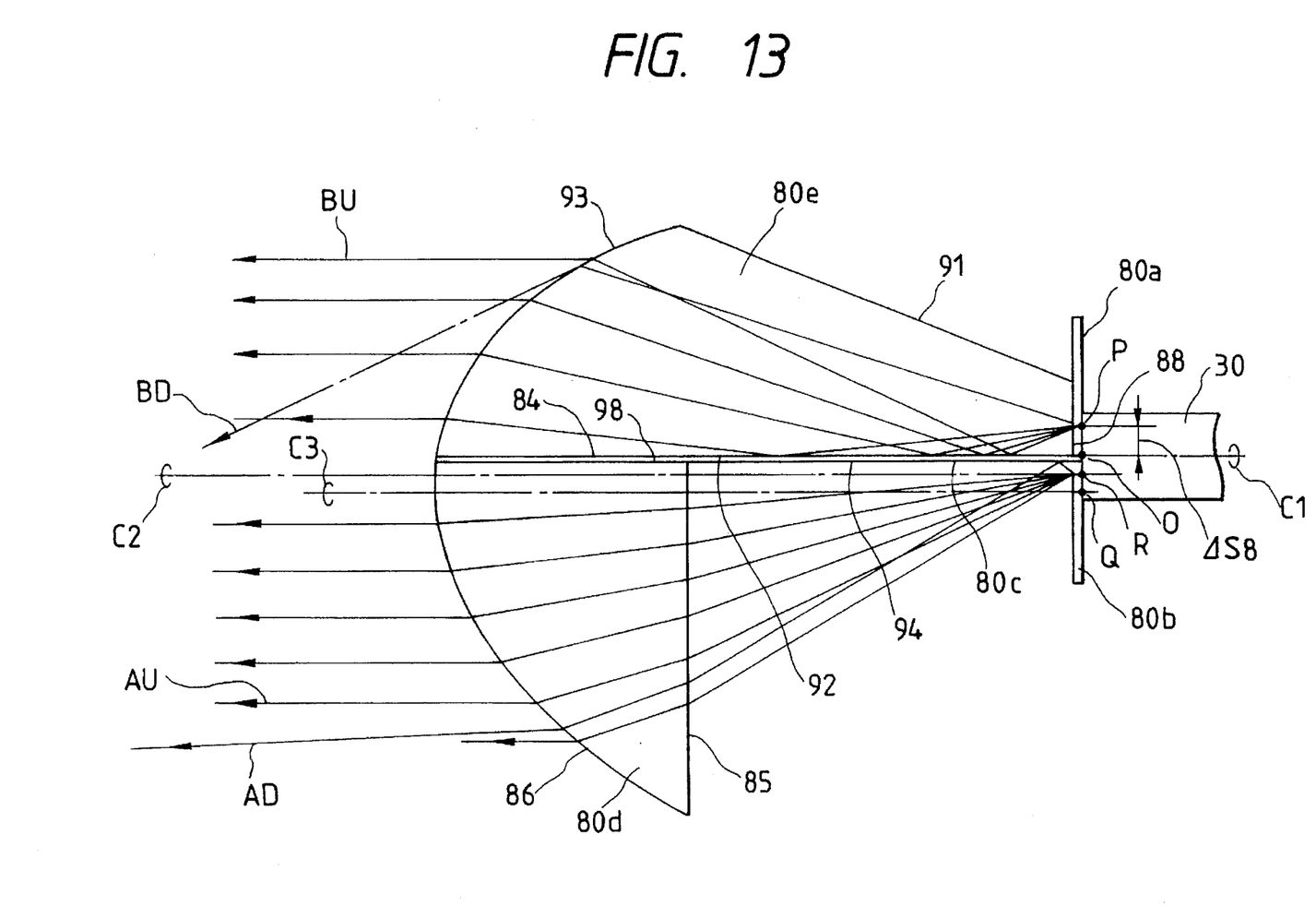
FIG. 13 is a side view of first and second optical members, a reflecting plate, and related parts of the left-hand head lamp in FIG. 12.

The semicircular convex lens 80d is located and directed so that, as shown in FIG. 13, light outputted from a region immediately above the intersection point "R" between the horizontal portion 96 and the inclined portion 97 of the lower shade 80b and directly entering the input surface 85 without being reflected by a reflecting surface 94 of the reflecting plate 80c will form approximately horizontally-travelling light AU leaving the output surface 86. Thus, the incidence-side focal point of the semicircular convex lens 80d coincides with the point "R". In addition, the axis (central line) c2 of the semicircular convex lens 80d extends parallel with an X axis and passes through the point "R". Therefore, as shown in FIG. 13, light outputted from the point "R" and entering the input surface 85 of the semicircular convex lens 80d while being reflected by the reflecting surface 94 of the reflecting plate 80c forms downwardly-sloping light AD leaving the output surface 86.

As in the embodiment of FIGS. 1–8, the output surface 86 of the semicircular convex lens 80d may be aspherical to compensate for aberration.

A second optical member 80e within the lamp body 80 includes a light guiding member provided above the reflecting plate 80c. The light guiding member 80e is made of material such as polycarbonate or acrylic which preferably has a good light permeability (transmittance). As shown in FIG. 12, the light guiding member 80e has a light incidence surface (light input surface) 88 extending along a flat plane parallel with the Y-Z plane. The light guiding member 80e has a pair of side surfaces 89 and 90 separated from each other by a distance which linearly increases in an X-axis direction. The light guiding member 80e has an upper surface 91 which upwardly slopes in the frontward direction of a vehicle. The light guiding member 80e has a bottom surface 92 extending along a flat plane parallel with the X-Y plane. The light guiding member 80e has a light emitting surface (light output surface) 93 extending along a cylindrical plane parallel with the Y axis.

The input surface 88 of the light guiding member 80e has an upper portion contacting the upper shade 80a, and a lower portion fixed to a light emitting end 31 of an optical fiber 30 by transparent adhesive. The bottom surface 92 of the light guiding member 80e extends above an upper surface 84 of the reflecting plate 80c by a small distance, and forms a reflecting surface for reflecting light which has entered the light guiding member 80e via the input surface 88. The side surfaces 89 and 90 of the light guiding member 80e are formed with reflecting surfaces similarly to the bottom surface 92.

The bottom surface 92 of the light guiding member 80e may be in contact with the upper surface 84 of the reflecting plate 80c. In this case, it is preferable to provide a reflecting surface on the upper surface 84 of the reflecting plate 80c to prevent the absorption of light by the reflecting plate 80c.

The light guiding member 80e is located and directed so that, as shown in FIG. 13, light being incident thereto from a region immediately below the lower edge of the upper shade 80a (the point "P") and advancing while being reflected by the bottom surface 92 will form approximately horizontally-travelling light BU leaving the output surface 93. Thus, the incidence-side focal point of the output surface 93 of the light guiding member 80e coincides with the point "Q" which exists on the X-Z plane and which downwardly separates from the point "O" by a given distance equal to the distance $\Delta S8$ between the points "P" and "O". In addition, the axis (central line) c3 of the light guiding member 80e extends parallel with the X axis and passes through the point "Q". Therefore, as shown in FIG. 13, light being incident to the input surface 88 of the light guiding member 80e and advancing without being reflected by the bottom surface 92 forms downwardly-sloping light BD leaving the output surface 93. As in the embodiment of FIGS. 1–8, the spreading angle (diverging angle) of the light beam emitted from the output surface 93 is narrower than 70 degrees in the Y-axis direction.

The embodiment of FIGS. 12 and 13 provides a light-intensity distribution pattern similar to that in FIG. 8. The embodiment of FIGS. 12 and 13 can illuminate a region forward of the vehicle up to a distant place. The shape of the cross section of the light beam emitted from the embodiment of FIGS. 12 and 13 agrees with a horizontally elongate configuration. According to the embodiment of FIGS. 12 and 13, the lamp body 80 can be compact.

Brighter light being directly incident to the first optical member 80d from the optical fiber 30 without being reflected by the reflecting plate 80c is divided into a larger beam and a smaller beam in a Z-axis direction. A portion of a hot zone which corresponds to the larger beam illuminates a region forward of the vehicle up to a distant place. Accordingly, the embodiment of FIGS. 11 and 12 is advantageous in safety provided by the ability to illuminate a distant place.

What is claimed is:

1. A lighting device for a vehicle, comprising:

an optical fiber having a light emitting end;

a reflecting plate extending from said light emitting end of said optical fiber and separating a region forward of said light emitting end of said optical fiber into first and second sub regions, said reflecting plate being constructed and arranged to reflect a portion of light emitted from said light emitting end of said optical fiber; and a first optical member located in said first sub region and being spaced away from said light emitting end of said optical fiber, said first optical member acting on light emitted from the light emitting end of the optical fiber and light reflected by the reflecting plate, wherein said first optical member is constructed and arranged to form a hot illuminated zone having a first brightness; and a second optical member located in said second sub region and acting on light emitted from said light emitting end of said optical fiber into said second sub region, wherein said second optical member is constructed and arranged to form an elongate illuminated zone having a second brightness lower than said first brightness.

2. The lighting device of claim 1, further comprising:

a first shade constructed and arranged to block a portion of light emitted from said light emitting end of said optical fiber toward said first sub region, and a second shade constructed and arranged to block a portion of light emitted from the light emitting end of said optical fiber toward said second sub region.

3. The lighting device of claim 2, wherein said first optical member extends below said second optical member.

4. A lighting device for a vehicle, comprising:

an optical fiber having a light emitting end;

a reflecting plate extending from said light emitting end of said optical fiber and separating a region forward of said light emitting end of said optical fiber into first and second sub regions, said reflecting plate being constructed and arranged to reflect a portion of light emitted from said light emitting end of the optical fiber; and an optical member located in one of said first and second sub regions and being spaced away from said light emitting end of said optical fiber, said optical member acting on light emitted from said light emitting end of said optical fiber and light reflected by said reflecting plate;

wherein said optical member has an incident surface which faces said light emitting end of said optical fiber, and said reflecting plate oriented such that a portion of light emitted from said light emitting end of said optical fiber is reflected by said reflecting plate and is then incident on said incident surface of said optical member, while another portion of light emitted from said light emitting end of said optical fiber is directly incident on said incident surface.

5. The lighting device of claim 4, wherein said optical member is subjected to an entire portion of light emitted from said light emitting end of said optical fiber into said one of said first and second sub regions in which said optical member is located.

6. The light device of claim 5, wherein said optical member is a first optical member, wherein the light device further comprises a second optical member, said first optical member and said second optical member being located in said first and second sub regions, respectively, said first optical member being constructed and arranged to form a hot illuminated zone having a first brightness, said second optical member acting on light emitted from said light emitting end of said optical fiber into said second sub region and being constructed and arranged to form an elongate illuminated zone having a second brightness lower than said first brightness.

7. The lighting device of claim 4, further comprising:

a first shade constructed and arranged to block a portion of light emitted from said light emitting end of said optical fiber which is directed toward said first sub region, and a second shade constructed and arranged to block a portion of light emitted from said light emitting end of said optical fiber which is directed toward said second sub region.

8. The lighting device of claim 6, wherein said first optical member extends below said second optical member.

9. The lighting device of claim 4, further comprising:

a first shade constructed and arranged to block a portion of light emitted from said light emitting end of said optical fiber toward said first sub region, a second shade constructed and arranged to block a portion of light emitted from said light emitting end of said optical fiber toward said second sub region, and a second optical member, said first optical member and said second optical member being located in said first and second sup regions, respectively, said second optical member being spaced away from said light emitting end of said optical fiber and acting on light emitted from said light emitting end of said optical fiber toward said second sub region.

10. The lighting device of claim 9, wherein said first optical member comprises a first Fresnel lens, and said second optical member comprises a second Fresnel lens.

* * * * *